Jan. 28, 1936.                G. N. WILLIAMS                2,029,206
          METHOD AND MACHINE FOR DRAWING OR PULLING WIRE
                    Filed Aug. 12, 1933        13 Sheets-Sheet 1

INVENTOR.
George N. Williams

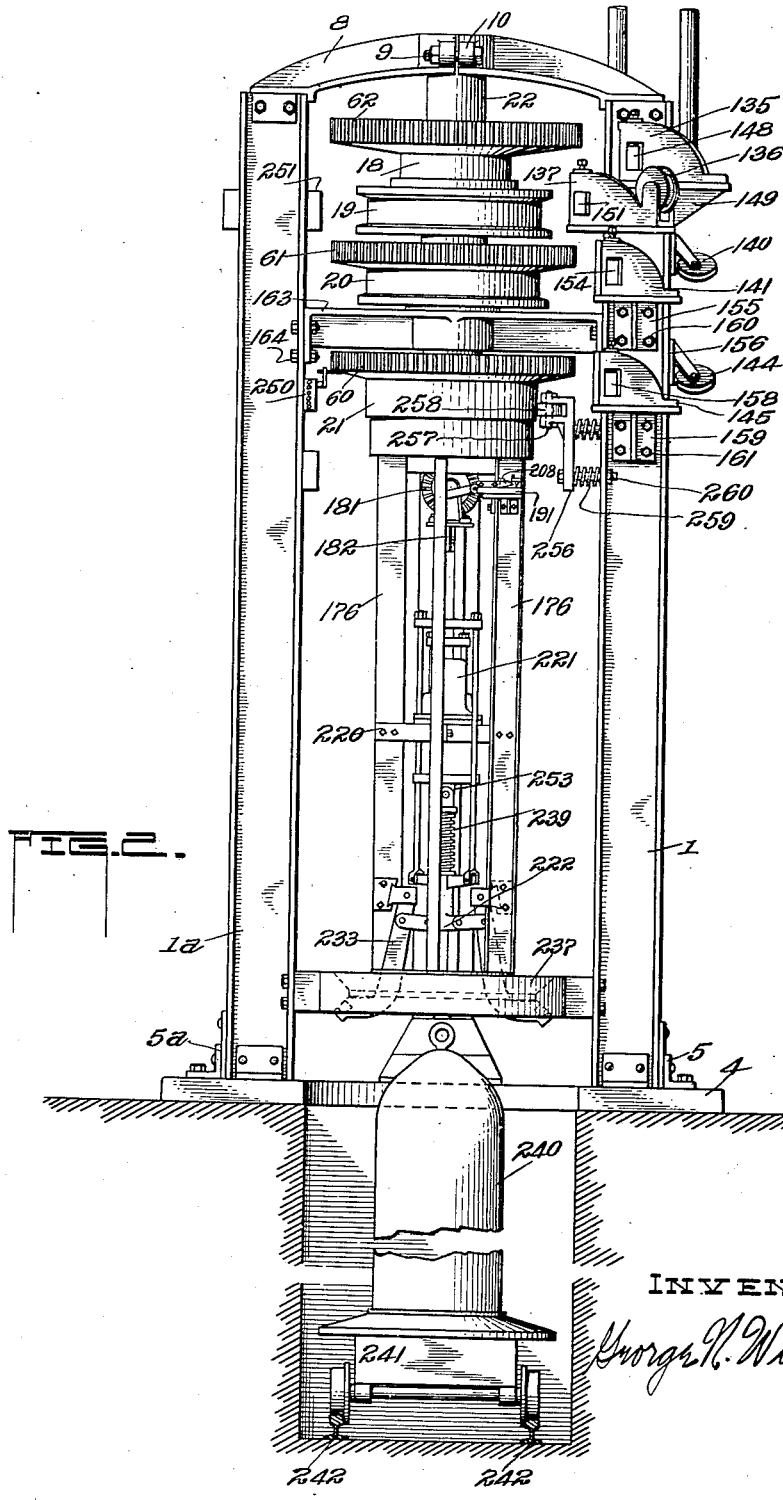

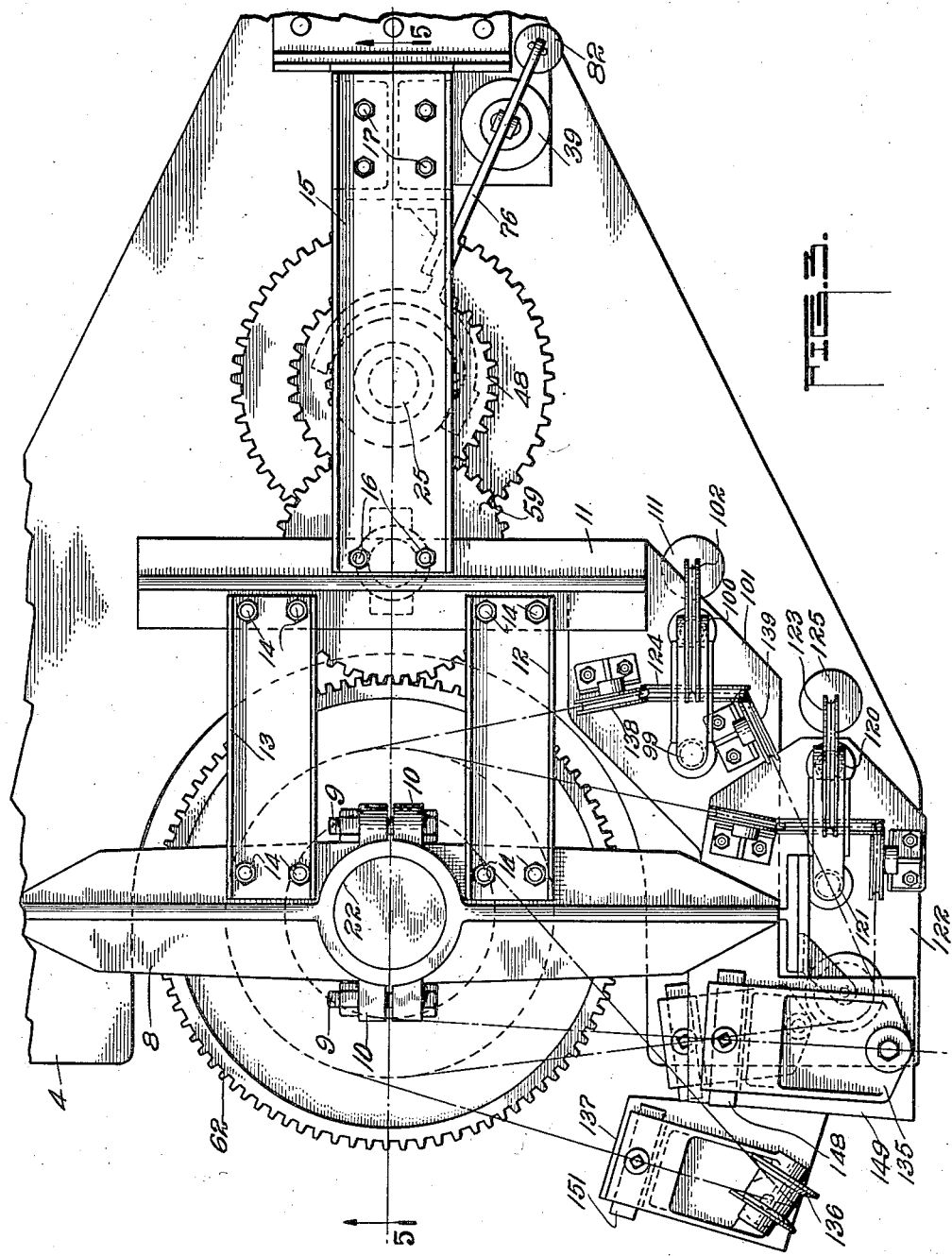

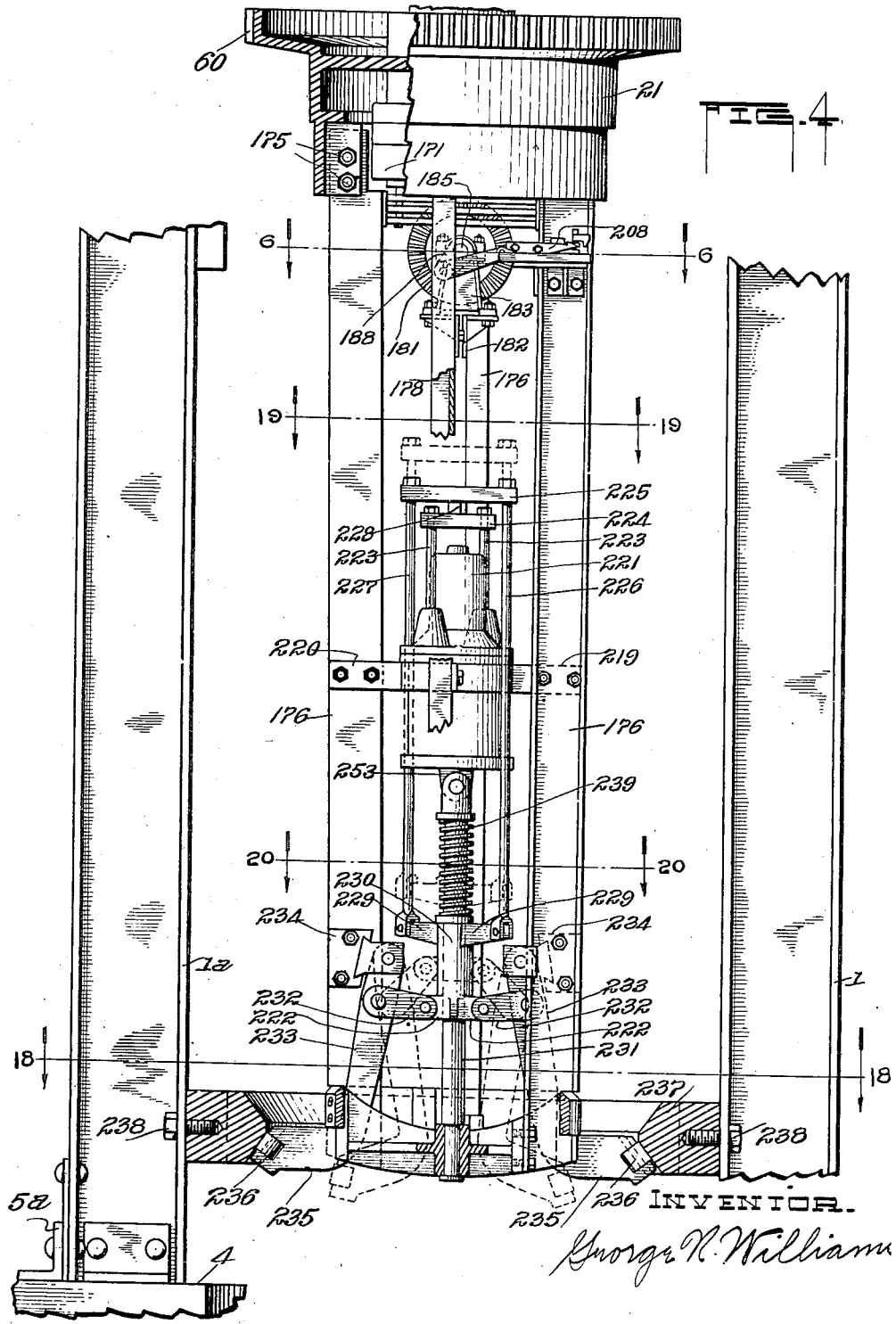

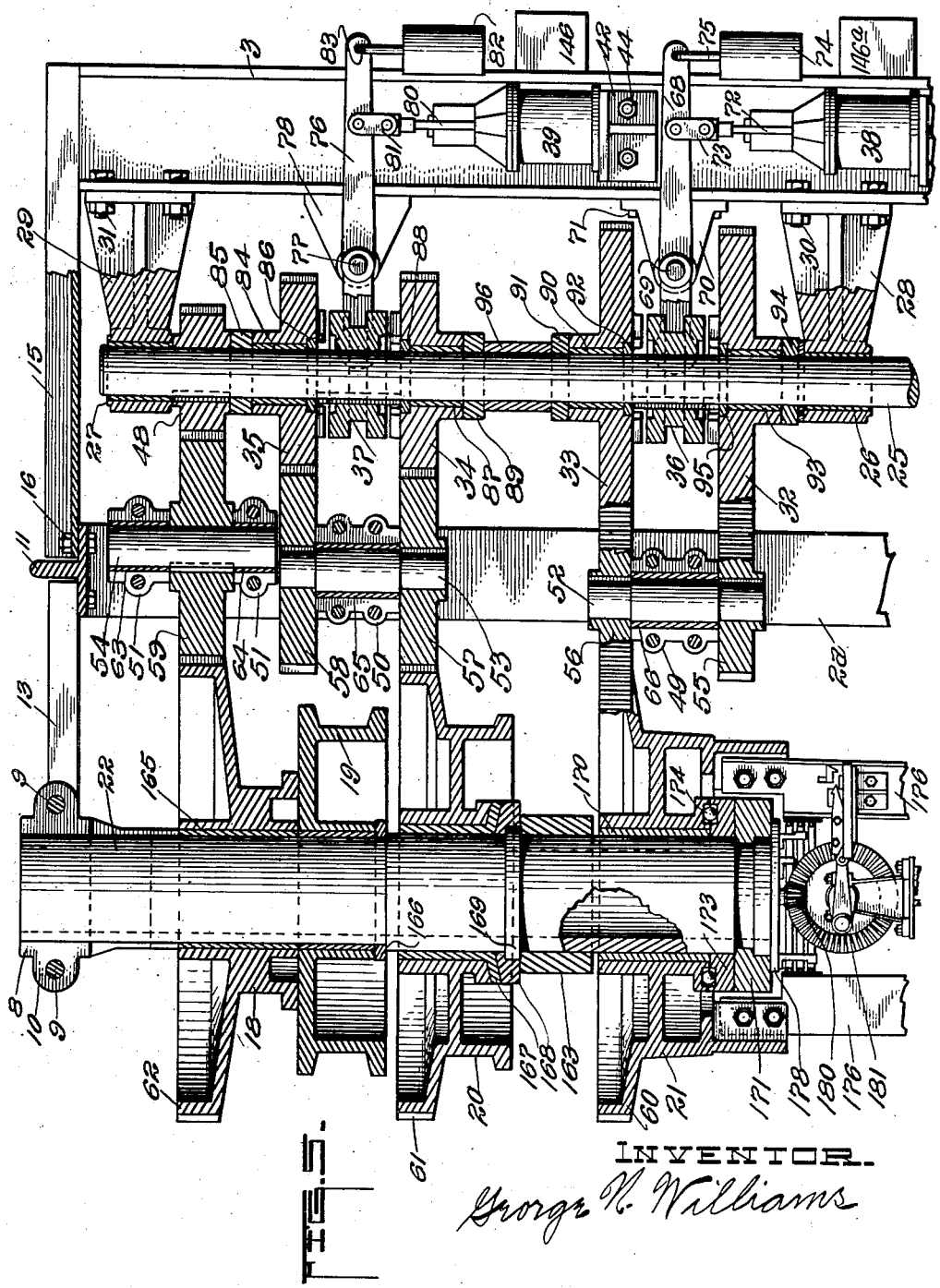

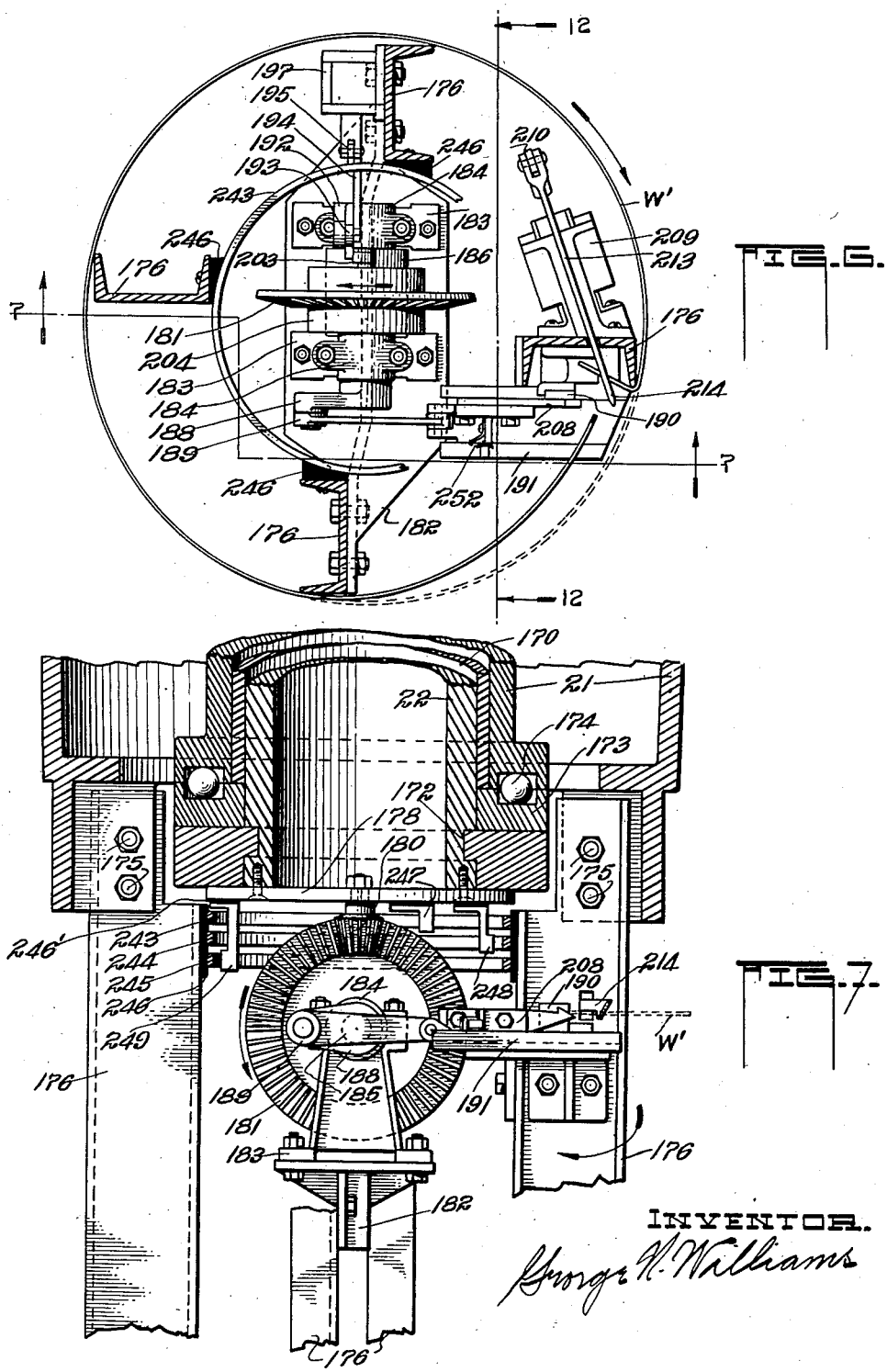

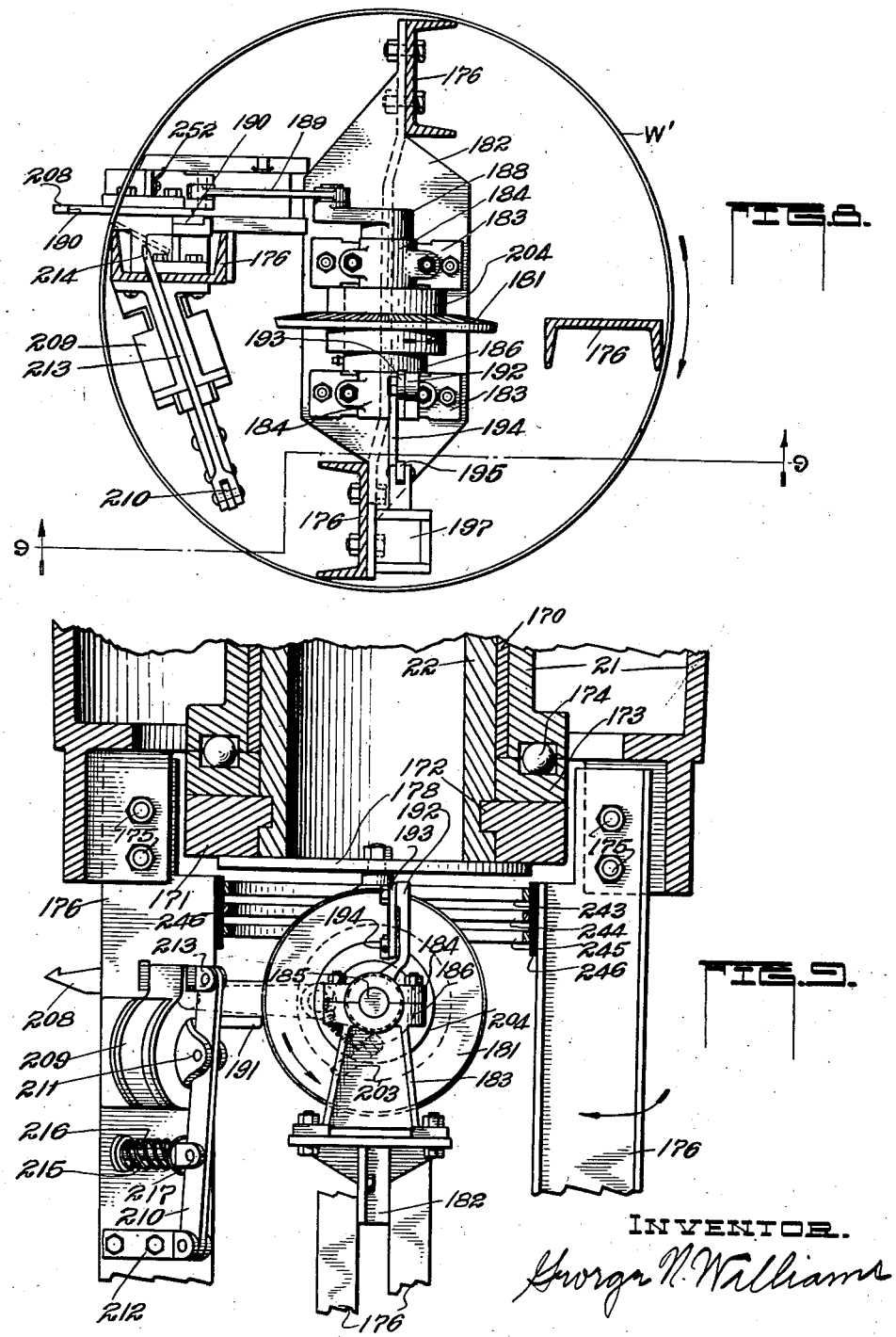

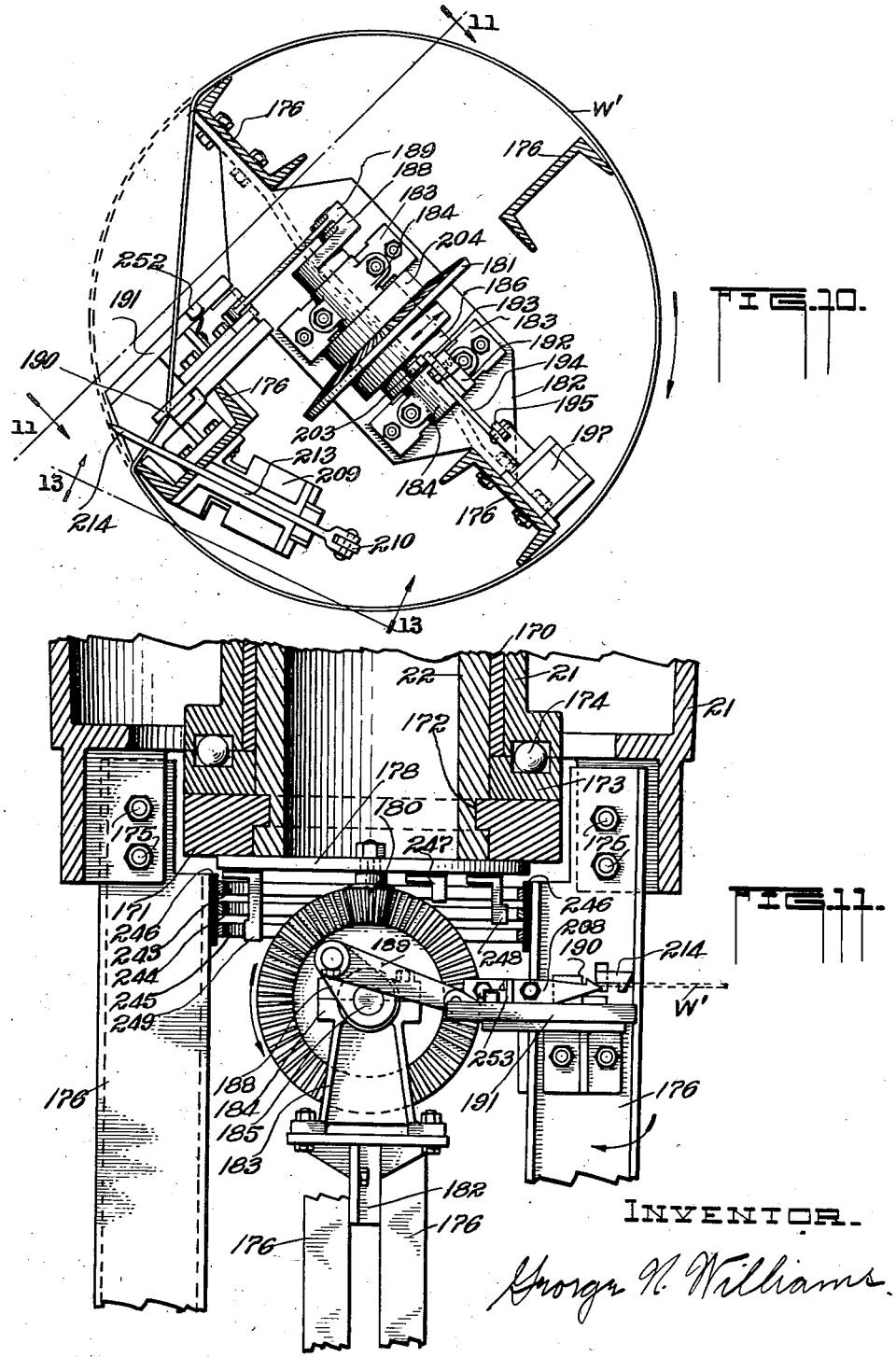

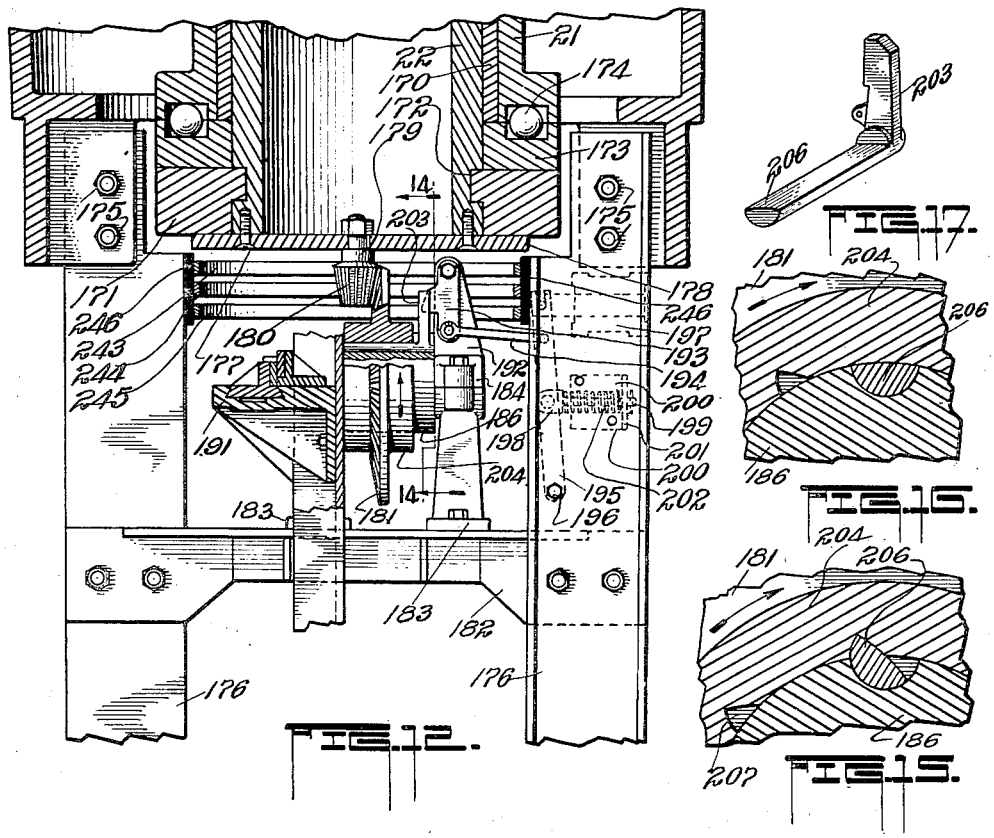

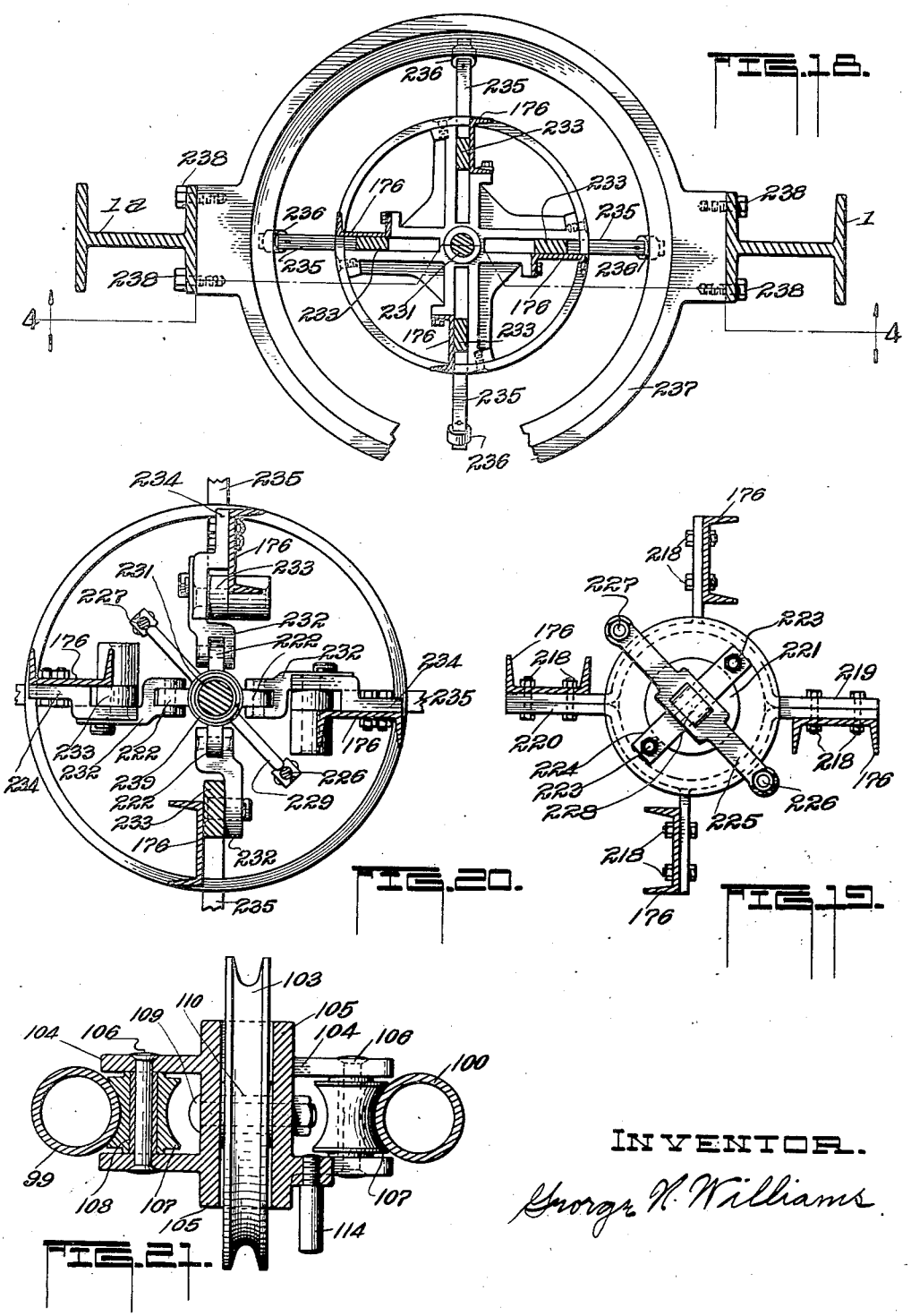

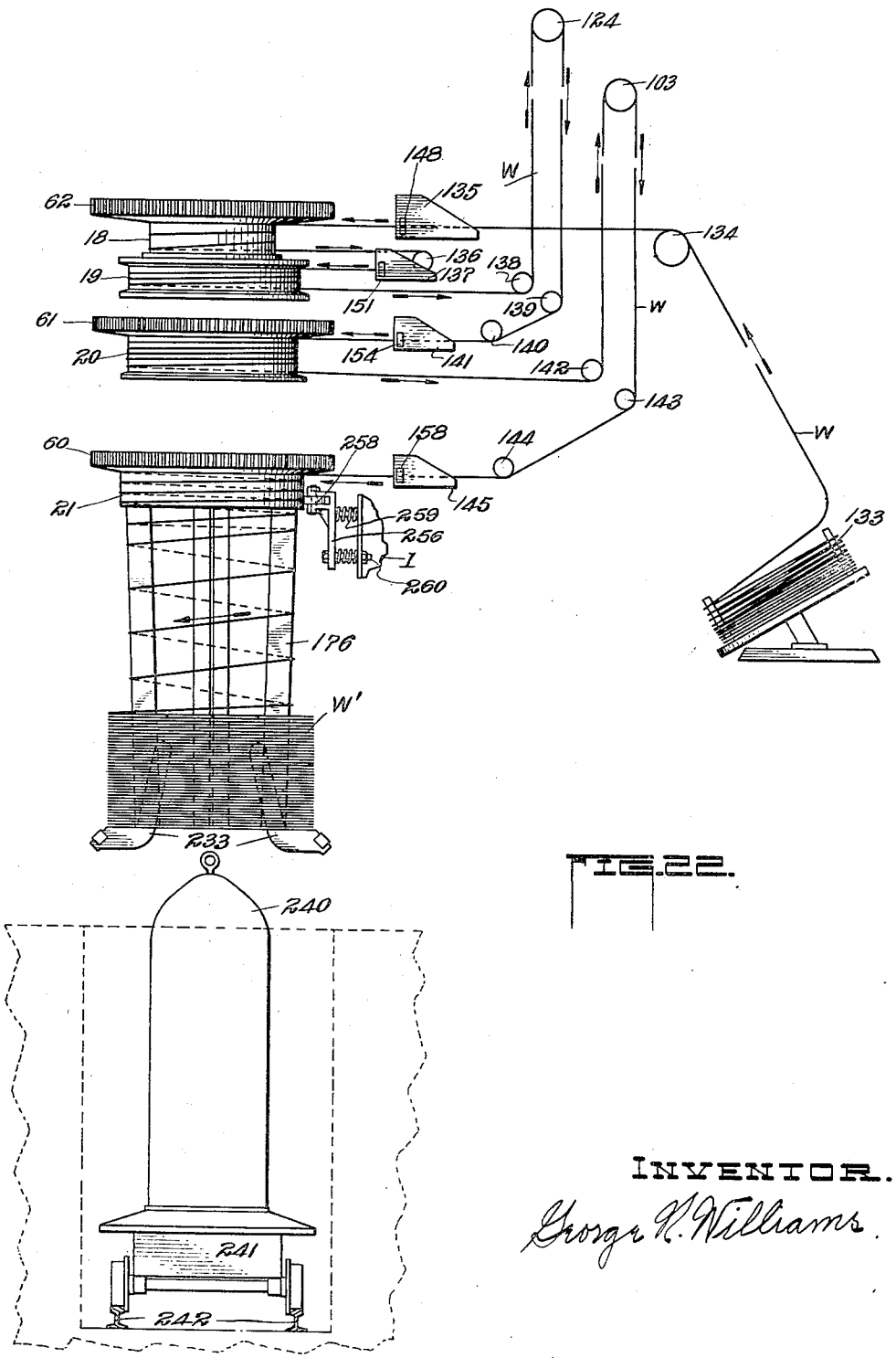

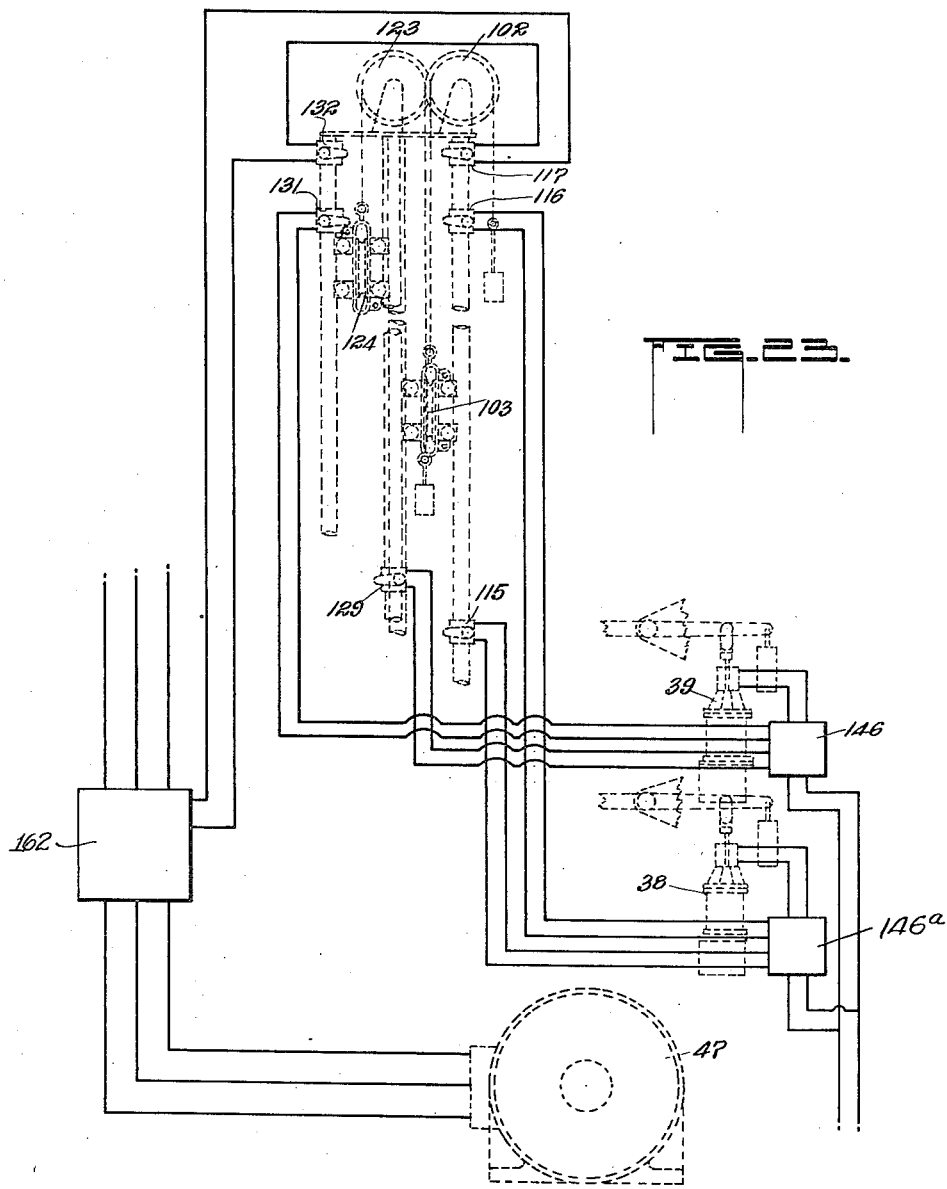

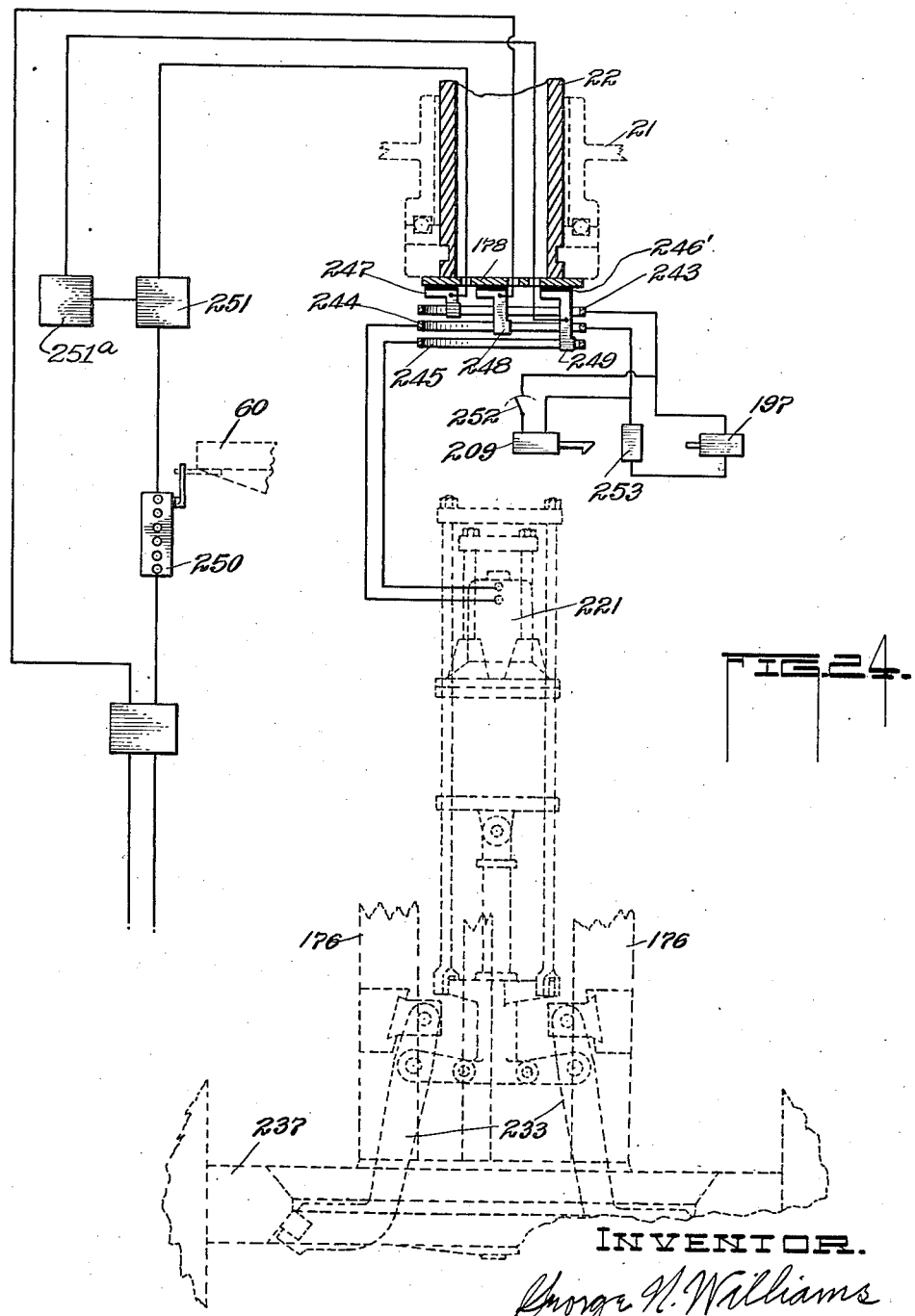

Patented Jan. 28, 1936

2,029,206

UNITED STATES PATENT OFFICE 2,029,206

METHOD AND MACHINE FOR DRAWING OR PULLING WIRE

George N. Williams, Kokomo, Ind., assignor to Continental Steel Corporation, Kokomo, Ind., a corporation of Indiana Application August 12, 1933, Serial No. 684,818

55 Claims. (Cl. 29—33)

This invention relates to a method and machine for drawing or pulling wire, and, in particular, to continuous wire drawing or pulling machines.

The principal objects of this invention are to provide; for continuously drawing wire; for automatically discharging a predetermined amount of finished wire from the machine without the necessity of stopping the machine; for regulating the speed ratio between certain of the drawing blocks; for automatically drawing predetermined weights and lengths of wire, especially extra heavy weights and extra long lengths; for automatically stopping the machine if the wire should break; for pulling wire where no dies are used and usually single pulling blocks, such as would be used on a wire coating take-up unit.

For the purpose of illustrating and explaining my invention, I show and describe a wire drawing machine having a multiple of drawing blocks preferably of the inverted type. It is understood, however, that this disclosure is not intended as a limitation, as more or less blocks may be used, and some blocks may be inverted and others not, as the case may be.

That the invention may be more fully understood reference is had to the accompanying drawings, forming a part of this specification, illustrating a preferred embodiment of this invention, in which:

Figure 2 is an enlarged partial front elevational view of parts shown in Figure 1;

Figure 3 is an enlarged top plan view of parts shown in Figure 1;

Figure 4 is an enlarged elevational view of parts shown in Figure 2, certain parts being broken away and shown in cross-section;

Figure 5 is a sectional elevational view as the same would appear if taken on line 5—5, of Figure 3;

Figure 6 is an enlarged sectional plan view, as the same would appear if taken along the line 6—6, of Figure 4;

Figure 7 is a sectional elevational view as seen along lines 7—7, Figure 6, looking in the direction of the arrows;

Figure 8 is a sectional plan view similar to Figure 6;

Figure 9 is a sectional elevational view as seen along line 9—9, Figure 8, looking in the direction of the arrows;

Figure 10 is a sectional plan view similar to Figure 8;

Figure 11 is a sectional elevational view taken on line 11—11, Figure 10, looking in the direction of the arrows;

Figure 12 is a sectional elevational view taken on line 12—12, Figure 6;

Figure 13 is a fragmentary elevational view taken on line 13—13, Figure 10;

Figure 14 is an enlarged fragmentary elevational view taken substantially along line 14—14, Figure 12;

Figure 15 is an enlarged fragmentary sectional view of parts appearing in Figure 14 showing the clutch tongue in its operating position;

Figure 16 is an enlarged fragmentary sectional view similar to Figure 15 showing the clutch tongue in its inoperative position;

Figure 17 is a perspective view of the clutch tongue, partially shown in Figure 14;

Figure 18 is a sectional plan view as the same would appear if taken along lines 18—18, Figure 4;

Figure 19 is a plan view, certain parts appearing in cross-section, as the same would appear if taken on line 19—19, Figure 4;

Figure 20 is a plan view, certain parts appearing in cross-section as seen along line 20—20, Figure 4;

Figure 21 is an enlarged sectional view of one of the sheave members taken on line 21—21, Figure 1;

Figure 22 is a diagrammatic view showing substantially the method employed in training and controlling the tension of the wire with respect to the drawing operation;

Figure 23 is a wiring diagram showing the electrical control circuits associated with operating members and prime mover, and Figure 24 is an additional wiring diagram showing the electrical control circuits associated with the wire cutting device and bundle discharge member.

Like characters of reference denote corresponding parts throughout the figures.

Frame structure

Figure 1:
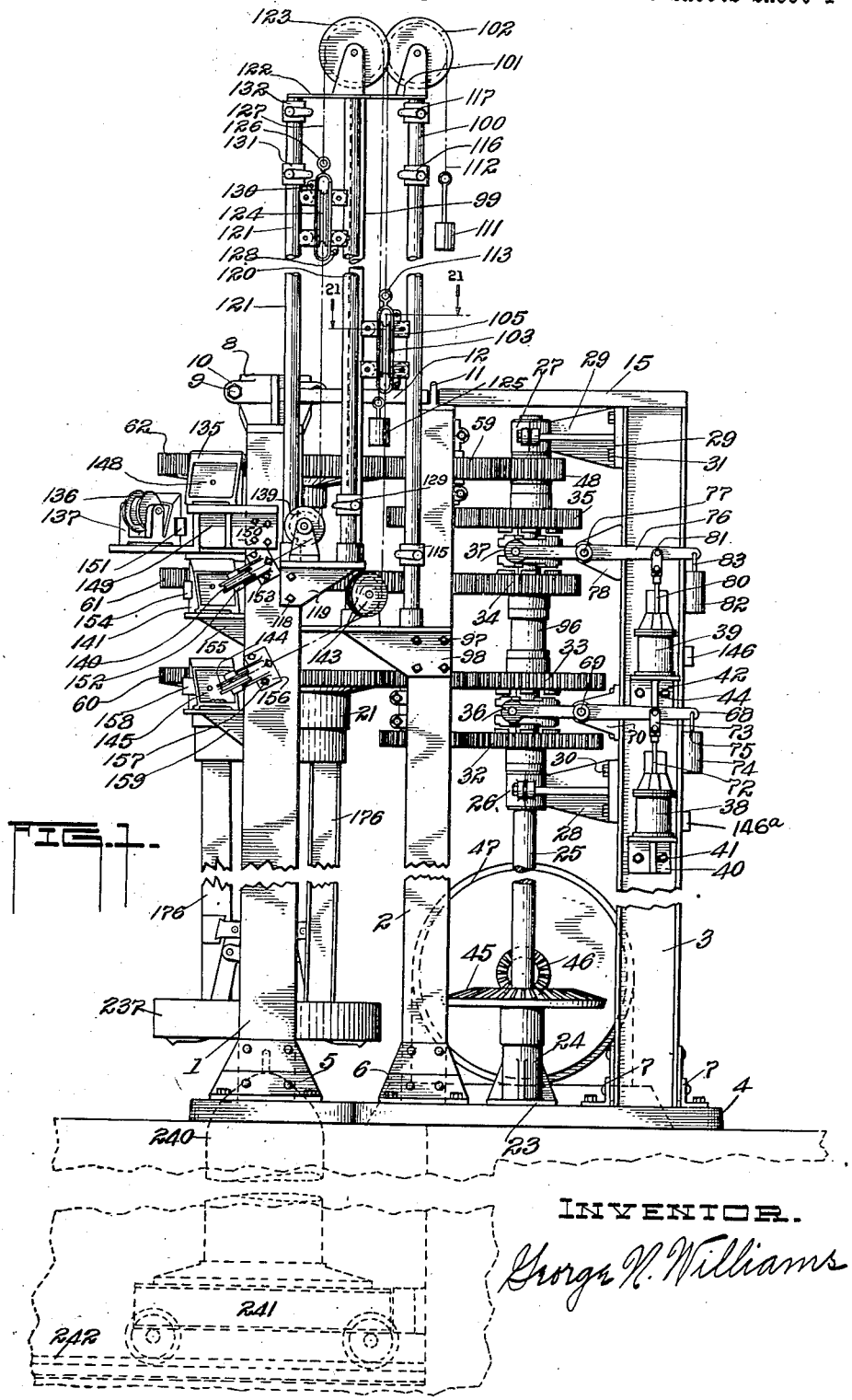
Figure 1 is a side elevational view of my wire drawing machine.

The frame supporting means comprises the upright members 1, 1a, 2, 2a, and 3, secured to a base 4 by means of angle plates 5, 5a, 6 and 7 respectively. Further bracing the members 1, and 1a, at their upper extremities is the cross member 8, adapted to be tensioned by means of tension adjusting bolts 9 passing through ears 10 of member 8, said member forming a circular central opening acting as an upper support for a shaft 22.

Member 11 is adapted to act as a transverse bracing means for support members 2 and 2a at their tops. For the purpose of longitudinal support are the members 12 and 13 secured to cross members 8 and 11 by means of bolts 14. Further longitudinal support and bracing is obtained by means of member 15 secured to cross member 11 by bolts 16 and to the top of member 3 by bolts 17.

These members comprise the principal supporting and reinforcing elements of my machine and provide the means for obtaining strength and rigidity. Subsidiary supporting means will appear as the description proceeds.

Wire drawing blocks

The wire drawing blocks 18, 19, 20 and 21 are adapted to revolve around the vertical hollow shaft 22. Said shaft 22 is positioned at its upper end by means of member 8 and supported near its lower end by member 163 secured to members 1 and 1a by bolts 164. Blocks 18 and 19 and bearing 165 revolve as one unit about shaft 22. Just below block 19, secured also to shaft 22, is end thrust support bearing 166.

Block 20 having bearing 167 secured thereto is adapted to revolve around shaft 22, said bearing 167 being also adapted to take the end thrust of said block. The bottom of said bearing rests on member 168 and is supported by shoulder 169 of shaft 22, said shoulder being carried by member 163 to support shaft 22.

Block 21 having bearing 170 secured thereto, is the finishing block of the series and is adapted to revolve around shaft 22. Secured also to shaft 22 near the lower end of said shaft is split ring 171 carried in annular groove 172 of shaft 22. Supported on said ring 171 is ball race 173 carrying ball bearings 174, the latter being adapted to take the end thrust of block 21. Ring 171 and ball race 173 are stationary, so that block 21, when revolving, is adapted to revolve with solid bearing 170, the end thrust being taken by ball bearings 174.

Secured to the frame support 1 by means of bolts 260 is arm 256 bent at right angles at its upper end into a bifurcated section adapted to hold roller 258 therebetween by means of a suitable bolt 257. Carried on bolts 260 and spaced between frame support 1 and the upright portion of arm 256 are springs 259 adapted to maintain tension against arm 256 and roller 258, the latter being held in yieldable relation against the wire on the upper part of block 21, thereby preventing the wire from sliding down the block until it passes said roller 158, thus preventing the formation of loose coils of wire about said block 21.

Driving means and clutch mechanism

The four drawing blocks 18, 19, 20 and 21, all revolve about the common hollow shaft 22. Blocks 18 and 19 are revolved as one unit and at one speed, whereas, blocks 20 and 21 are revolved as separate and independent units, and each of the latter two blocks may be revolved at two different speeds for purposes to be later described. The means by which said drawing blocks are revolved and the clutch and gear mechanism for changing the speeds of certain of said blocks will now be described.

Secured to the base 4 is a pedestal 23 carrying bottom bearing 24 of shaft 25 and a bearing (not shown) adapted to take up the end thrust of said shaft. Said shaft 25 is further supported by means of split bearings 26 and 27 carried on supports 28 and 29, respectively, said supports being secured to support member 3 by bolts 30 and 31, respectively. Loosely mounted on said shaft 25 are driving gears 32, 33, 34 and 35. Adapted to engage either gear 32 or 33 is clutch 36, and to engage either gear 34 or 35 is clutch 37, said clutches being slidably keyed to shaft 25 and are adapted to be operated by means of clutch operating thrustors 38 and 39, respectively. Thrustor 39 is mounted on pedestal 42 secured to member 3 by means of bolts 44. Keyed to shaft 25 near its lower end is the bevel gear 45 meshed with pinion 46 driven by prime mover 47, such for instance, as an electric motor or other suitable power means. Keyed also to shaft 25 near its upper end is driving gear 48.

In meshed relation with driving gear 48 is gear 59 keyed to shaft 54 journaled in bearings 63 and 64 mounted in brackets 51 secured to support members 2 and 2a. Gear 59, in turn, engages in constant meshed relation with gear 62 of drawing blocks 18 and 19.

Driving gear 35 having bearing 84, thrust bearing 86, and thrust collar 85 associated therewith, is meshed with gear 58; and driving gear 34 having bearing 87 and thrust bearing 88 and thrust collar 89 associated therewith, is meshed with gear 57, which, in turn, is in constant meshed engagement with gear 61 of drawing block 20.

Gears 57 and 58 are keyed to shaft 53 which is journaled in bearing 65 mounted on bracket 50 and attached to members 2 and 2a, below and in offset relation to bracket 51 and its assembly.

Separating the assemblies of gears 34 and 35 from the assemblies of gears 32 and 33, and carried on shaft 25 is spacer 96.

In meshed relation with driving gear 33 having bearing 90, thrust collar 91 and thrust bearing 92 associated therewith, is gear 56, which, in turn, is in constant meshed engagement with gear 60 of drawing block 21. In meshed engagement with driving gear 32 having bearing 93, thrust collar 94 and thrust bearing 95 associated therewith, is gear 55. Gears 55 and 56 are keyed to shaft 52, the latter being journaled in bearing 66 mounted in bracket 49 attached to members 2 and 2a, below and in offset relation to assemblies of brackets 50 and 51.

Slidably keyed to shaft 25 are the clutches 36 and 37, the former adapted to engage driving gear 33 when said clutch 36 is in its upper engaging position and to engage driving gear 32 when in its lower engaging position. Clutch 37, when in its upper clutching position, engages driving gear 35, and in its lower clutching position engages driving gear 34.

Both clutches 36 and 37 may be positioned to idle or neutral position as shown in Figure 5, and are adapted to be automatically operated by thrustors 38 and 39, as will be later described.

Clutch engaging lever 68 is fulcrumly pivoted on pivot 69 mounted on bracket 70 attached to member 3 by bolts 71, said lever adapted to be moved upwardly or downwardly by reverse movements of shaft 72 of thrustor 38 attached to lever 68 by means of clevis 73. Clutch lever 68 is over-balanced for the weight of clutch 36 by weight 74 secured to said lever by hanger 75.

Clutch engaging lever 76 is fulcrumly pivoted on pivot 77 mounted on bracket 78 which is attached to member 3, said lever being adapted to be moved upwardly or downwardly by reverse movements of shaft 80 of thrustor 39 attached to lever 76 by means of clevis 81. Clutch lever 76 is over-balanced for the weight of clutch 37 by weight 82 secured to said lever by hanger 83.

The operation of the drawing block driving means, therefore, is as follows:

Pinion 46 driven by the prime mover 47 causes gear 45 to revolve and, in so doing, revolves shaft 25. With clutches 36 and 37 in their neutral positions, as best seen in Figures 1 and 5, the clutches revolve ineffectively with shaft 25 but driving gears 32, 33, 34 and 35 do not revolve. Gear 48 being keyed to shaft 25, and independent of any clutch mechanism, revolves at all times with said shaft, and consequently drawing blocks 18 and 19 are caused to revolve continuously therewith. As will appear more fully later, the only necessity for stopping blocks 18 and 19 is when it becomes necessary to rethread the wire due to breakage or for some other cause.

When clutch 37 is caused to engage with gear 34, then gear 57 is actuated and revolves block 20, thru gear 61, above normal speed. Inasmuch as shaft 53 will also be revolved, gear 58 also revolves and, in turn, will revolve gear 35, the latter, in this case, however being an idling gear and not a driver.

However, when clutch 37 is caused to engage with gear 35, then the latter becomes the driving gear and, thru gear 58 and shaft 53, drives gear 57 and block 20 thru gear 61, but at a speed below normal due to the difference in the gear ratios shown. When gear 35 is the driving gear, then gear 34 is an idler.

Similarly, when clutch 36 is caused to engage with gear 33, the latter drives gear 56, thus imparting rotation to gear 60 and causing block 21 to revolve above normal speed. Gear 56 when revolving causes shaft 52 to revolve and so revolves gear 55, gear 32 thereby being an idler. Similarly, when clutch 36 is caused to engage with gear 32, the latter becomes the driving gear, revolving block 21 thru gear 55, shaft 52, gear 56 and gear 60, thus causing block 21 to be rotatively driven below normal speed.

The clutch moving means and the resultant gear changes will now be described in connection with the wire tensioning means, the latter being the means through which the clutch movements are caused to operate.

*Wire tensioning means and drawing block speed regulation*

Secured to frame member 2 by means of bolts 97 is support 98 upon which are mounted tubular members 99 and 100 surmounted by plate 101 upon which is mounted pulley 102. Mounted between the tubular members 99 and 100 is a sheave 103 adapted to slide up and down therebetween. Secured to extension arms 104 of the sheave housing 105 are the shafts 106 adapted to have the rollers 107 revolve thereabout on bearings 108. The sheave 103 revolves about shaft 109 on bearing 110, said shaft being mounted in sheave housing 105. This is best seen in Figure 21. The sheave housing 105 and its assembly is overbalanced by a weight 111 connected with eye 113 of housing 105 by means of a cable 112 which passes over pulley 102.

Suitably secured to the sheave housing 105 is a trip pin 114 adapted to contact and operate switches 115, 116, 117, said switches being adjustably mounted on the tubular member 100, and adapted automatically to put into operation the means for controlling the rotational speed of drawing block 21, in a manner to be later described.

Secured to frame member 1 by means of bolts 118 is support 119 upon which are mounted tubular members 120 and 121 surmounted by plate 122 upon which is mounted pulley 123. Mounted between the tubular members 120 and 121 is a sheave 124 adapted to slide up and down therebetween. The construction assembly of sheave 124 is preferably like that shown for sheave 103—see Figure 21. Sheave 124 and its assembly is likewise overbalanced by a weight 125 connected with eye 126 by cable 127 passing over pulley 123.

Suitably secured to the housing of sheave 124 is a trip pin 128 adapted to engage and operate switch 129 mounted on the tubular member 120. Also secured to said housing is a trip pin 130 adapted to engage and operate switches 131 and 132. The operation of switches 129 and 131 controls the speed of drawing block 20 and the operation of switch 132 controls the operation of the machine as will be later described.

A supply of wire rod W to be drawn by my improved machine is illustrated in Figure 22, held on the reel 133, and a length therefrom is shown threaded into said machine by passing the same over guide pulley 134, thru drawing die 148 held in die housing 135, the latter being mounted on support 149 secured to frame member 1 by bolts 150, said wire being coiled around block 18. From the latter, the wire passes around pulley 136, then through die 151 held in die housing 137, said pulley 136 and housing 137 being mounted on support 149, best seen in Figure 1. From die 151, the wire passes a few coils around drawing block 19, then under guide pulley 138 mounted on support 119, and then upwards around sheave 124 and downwardly under guide pulley 139 and guide pulley 140, the latter being mounted on support 152 attached to member 1 by means of bolts 153. The wire then passes through die 154, held in housing 141 mounted on support 155 attached to member 1 by bolts 160, and then a few coils around drawing block 20. From here the wire passes under pulley 142, then upwards around sheave 103, from which it passes downwardly under guide pulley 143, then under pulley 144 mounted in housing 156 attached to member 1 by bolts 157, and from the latter pulley, said wire passes through die 158 held in housing 145 mounted on support 159 attached to member 1 by means of bolts 161.

As was previously described, drawing blocks 20 and 21 each have two changeable speeds, one speed above the theoretical speed for the gauge of the respective wire being drawn thereby and the amount of reduction per draw, and a second speed which is below said theoretical speed.

The manner in which these speeds are controlled by the loops of wire passing around the respective sheaves 124 and 103 will now be described.

For this purpose, consider the wire passing from drawing block 19 under pulley 138, up and over sheave 124, under pulley 139, under pulley 140, thru wire drawing die 154 on to drawing block 20. With clutch 37 engaging driving gear 35, block 20 will be rotated on slow speed (below normal), consequently more wire will be delivered to the loop than is being capably drawn by block 20. Therefore sheave 124 actuated by weight 125 will be caused to rise, until it engages electrical switch 131. This contact, in turn, through the circuit shown in Fig. 23 will cause magnetic switch 146 to be energized, causing the motor, not shown, in thrustor 39 to operate.

The operation of said motor causes lever 76 to lift, thus disengaging clutch 37 from gear 35 and engaging said clutch with its other gear 34.

The shifting of said gears causes block 20 to be rotatively driven above normal speed and consequently more wire is drawn by block 20 than is being delivered to the loop from block 19. Therefore sheave 124 will be pulled slowly downward until it engages switch 129. This engagement causes magnetic switch 146 to be energized and stops the motor, not shown, in thrustor 39, thereby allowing weight 82 to pull lever 76 downwardly, thus disengaging clutch 37 from gear 34 and engaging said clutch with gear 35, which again causes block 20 to rotate at the slow (below normal) speed.

In an exactly similar manner, the loop between blocks 20 and 21 passing around pulley 142, sheave 103, pulleys 143 and 144 causes changes in the speed of drawing block 21 by acting through magnetic switch 146a, thrustor 38, lever 68 and clutch 36, except for the difference previously noted, that the high speed driving gear 33 is located above slow speed gear 32 which is the reverse of gears 34 and 35 of block 20.

Block 21, by reason of its driving gear connections to have a greater range of speed than block 20, that is, the slow speed of block 21 is slower in proportion to normal speed, and its high speed faster in proportion to normal speed than for block 20. For this reason wire cannot be fed faster or slower to block 21 than said block can accommodate.

If the wire W should break between block 19 and 20, sheave 124 will immediately be released and actuated by weight 125, and will be drawn rapidly in an upward direction to engage switch 132 which opens the circuit in the main drive motor switch 162 and stops the operation of the machine.

In an exactly similar manner, a break in wire W between block 20 and block 21 will cause sheave 103 to rise and engage switch 117 which, acting similarly through switch 162, will stop the operation of the machine.

The wiring of the electrical parts for the speed regulating and machine stopping mechanism is illustrated in Figure 23; Figure 22 illustrates diagrammatically the threading of the wire through the machine and the relative position of the loops and switch operating sheaves 124 and 103.

*Wire cutting and discharging mechanisms*

Secured to block 21 by means of bolts 175 and adapted to revolve therewith, are four vertical channeled frame members 176. Secured to the bottom of the stationary shaft 22 by means of machine bolts 177 is a plate 178. Rigidly and centrally suspended from said plate 178 and separated therefrom by collar 179, is stationary pinion 180 engaged in meshed relation with a revolvable ring gear 181. It will be understood that upon rotation of the block 21, member 176, support 182 and the assembly mounted thereupon will be likewise rotated therewith, and such rotation causes the ring gear 181 which is in meshed relation with the stationary pinion 180 to be rotated thereby about the clutch member 186. Secured to two opposite members 176 is support 182. Mounted on said support are brackets 183. Journaled in housings 184, carried on said brackets, is shaft 185 to which is keyed clutch member 186 on which floats ring gear 181, the latter being part of clutch assembly designated 187. Secured to shaft 185 is crank 188, having crank rod 189 attached thereto. Carried also therewith is wire-engaging finger 208 guided in a tapered slot in housing 191 secured to a member 176, housing 191 also having cut-off blade 190 secured thereto.

Secured at one of its ends to support member 192 is a stop-pin arm 193, its lower end swinging free and having attached thereto a lever arm 194, the latter being pinned to an actuating arm 195. The latter arm is rockably secured to a member 176 at 196 and is connected at its upper end with a solenoid 197, so that it may be moved thereby. Also attached to arm 195 by clevis 198, is a bar 199, the latter being held in plate 200 secured to said member 176 and having a short bent leg 201 formed therein. Supported by bar 199 and lying between clevis 198 and leg 201 is compression spring 202 adapted through arm 195, lever 192 and stop-pin arm 193 to keep the latter in position against movement of clutch pin dog 203 and of clutch assembly 187, until solenoid 197 is actuated and pulls stop-pin arm 193 away from dog 203 and allows clutch 187 to function. The clutch, per se, is shown in Figures 14, 15, 16 and 17, the inner member 186 being secured to shaft 185 and member 204 and ring gear 181 being loosely mounted on member 186. When stop-pin 193 is drawn back by action of solenoid 197, dog 203 is pulled forward by spring 205, thus tilting clutch tongue 206 upward to engage one of slots 207 in member 204 and thereby causing member 186 and shaft 185 to rotate and actuate the movement of crank 188 and cut-off pin 190.

This operation is illustrated in Figure 8, which shows the wire cutter clutch engaged and the first step of the cutting operation has been accomplished, finger 208 having been advanced into the bundle of wire W' and selected one strand therefrom, and Figure 10 illustrates the next movement, where said wire strand has been drawn inwardly by finger 208 against cut-off blade 190 and severed.

Secured to a member 176 is another solenoid 209 having lever arm 210 fulcrumly attached to the moving part of said solenoid at 211. At its lower end, said lever arm 210 is rockably attached to brace 212 the latter being secured to said member 176. At its upper end, lever arm 210 has attached thereto one end of a bar 213 carrying finger 214 at its opposite end. Also secured to lever arm 210 is spring 215 carried on pin 216 having clevis 217 at one end attached to lever arm 210 and secured to said member 176 at its opposite end, said spring being adapted to push lever arm 210 outwardly away from said solenoid or in other words the carrying finger 214 in retracted position when the solenoid is de-energized.

Figure 10 illustrates the extended finger 214 about to engage the strand of wire which has just been severed from bundle W'. The finger has been moved forward by solenoid 209 acting on lever arm 210. At the forward point of movement of finger 214, solenoid 209 is de-energized and spring 215 forces lever arm 210 back and thereby pulls the wire strand W' engaged by finger 214 around one angle of channel member 176 and so secures said wire.

Supported also by members 176 and secured thereto by bolts 218 are the split supporting members 219 and 220 which support the thrustor 221 with its assembly and the toggle 222 and its assembly.

Attached to thrustor 221 are the pins 223 adapted to be raised by said thrustor. Secured to said pins 223 at their upper ends is a crossbar 224, adapted when raised by said thrustor to act against bar 228 and raise cross-bar 225 attached to rods 226 and 227 which operate toggle 222. Pins 226 and 227 are attached at their lower ends to yoke 229 of sleeve 230, the latter being slidably mounted on shaft 231. Secured to the lower end of sleeve 230 are toggle links 232 secured to toggle arms 233 and at the opposite end of said links there being four such toggle arms. At their upper ends, the toggle arms 233 are fulcrumly mounted to members 176 by plates 234. At their lower ends said toggle arms 233 are bent to form the bundle carrying members 235, said toggle arms being bent outwardly at substantially right angles when disposed in a bundle supporting position. At the outer edge of said members 235 are the rollers 236 adapted to ride on the circular guide member 237, the latter being secured to members 1 and 1a by means of machine bolts 238.

Mounted above sleeve 230 on shaft 231 is a coiled spring 239 adapted to normally keep the toggle arms 233 in an outwardly disposed bundle supporting position when said arms 233 are not withdrawn or collapsed by action of the thrustor 221.

When a sufficient or predetermined amount of wire has accumulated on block 21, best seen diagrammatically in Figure 22, and after the wire has been severed as has been described, then thrustor 221 is energized and acting through pins 223, bar 228 and rods 226 and 227, raises sleeve 230 against the spring 239. The sleeve 230 in moving upward raises links 232 and pulls toggle arms 233 inwardly. This allows the severed bundle of wire W' to drop by gravity on a wire receiver 240 mounted on a carrier or truck 241, the latter preferably adapted to be moved along rails 242.

As soon as the severed bundle of wire has been discharged from said machine, thrustor 221 is de-energized and compressed spring 239 forces said toggle arms into their normal bundle supporting position.

Secured to members 176 and immediately below the stationary plate 178 are electrical contact rings 243, 244 and 245 suitably insulated from said members 176 by any well known insulating material 246. Secured to plate 178 are brush contact holders 247, 248 and 249 insulated from said plate by an insulating material 246', said holders 247, 248 and 249 adapted for continuous brush contact relation with the revolvable rings 243, 244 and 245, respectively, as shown. Mounted preferably on member 1a is an adjustable revolution counter 250 and a time relay 251.

The operation of the wire cut-off or severing means and the bundle discharging mechanism depends on the weight or length of wire required to be drawn. These requirements are initially calculated to the number of revolutions necessary to be made by block 21 to draw the required amount of wire. Revolution counter 250 is then set, so that at a given number of revolutions a contact switch is caused to function starting the time relay 251, which energizes ring 243, ring 244, the same being energized at all times. Rings 243 and 244 are connected by circuit to solenoid 197 thru time relay 253, so that the solenoid 197 is caused to operate as has been described, thus causing clutch 187 to operate and make one complete revolution, and stop. The operation of clutch 187 acting through crank 188 causes the wire cut-off mechanism to function.

Immediately following the time of wire cut-off, the time relay 251 starts a second time relay 251a to close a switch which holds on for a predetermined length of time. This switch energizes ring 245 to which switch 252 and thrustor 221 are connected.

Thrustor 221 is thereby energized and is caused to operate as has been described, causing sleeve 230 to withdraw the four holding arms 233 inwardly, thus allowing the severed bundle of wire to drop by gravity. This operation takes approximately from 1½ to 2 seconds.

Meanwhile switch 252 is closed momentarily, causing solenoid 209 to operate. The operation of solenoid 209 causes the notched bar 214 to more over the wire which has been drawn in and is just at the cut-off point.

Switch 252 is opened by the movement of the cut-off blade 190, thus de-energizing solenoid 209 and allowing spring 215 to return notched bar 214 to its normal position, thereby bending the severed end of wire W' around the flange of one channel 176 during its return movement.

The cut-off blade 190 continues to the end of its stroke and advances until switch 252 is closed and open again thus causing a repeat operation of solenoid 209, which releases the bent wire from notched bar 214.

The bundle holding arms 233 being retracted and the wire cut, the severed bundle is free to drop on the bundle receiver 240.

When this takes place the time relay 251 then breaks the circuit to ring 245, which stops the motor, not shown, in thrustor 221, dropping piston 253 thereof to its normal position, spring 239 then acting to force the toggle arms 233 outwardly to their normal bundle supporting position.

In the meantime block 21, as well as the other drawing blocks, continue to revolve and draw wire, the entire process being continuous and not ceasing while the cutting-off and bundle discharging operations take place.

As long as the same weight of wire is required, or same length of a given gauge, one setting of the revolution counter is all that is required. No change is required for given lengths of wire regardless of the gauge.

Inasmuch as tables may be prepared showing the setting to be made on the revolution counter for any weight of wire desired within the capacity of the machine, it is thus obvious that this change may be made in a few seconds.

It will also be obvious from the foregoing description that although the wire tensioning means is shown for certain blocks, it may be applied to all of the blocks, if desired. This is true, also, of the arrangement shown for stopping certain blocks in case of wire breakage.

It will be obvious, also, that the mechanism shown in association with the wire drawing blocks may be applied also to wire pulling blocks, such for example, as those used in wire galvanizing or coating take up units where the wire is not reduced in size and consequently does not pass thru drawing dies.

To avoid a surplusage of wording in the claims, reference will be made to the term "main wire body". By this will be meant the wire, or that part of the wire, which is attached to, or a part of, the wire coming from the reels, or from a preceding drawing block or other source.

In the following claims the expression "amount of wire" refers to length or weight of wire or both in a broad sense, and is used to avoid a multiplicity of claims. For clarity and simplification it will be understood that reference to wire drawing systems, or blocks, includes wire drawing dies, power mechanism and the usual ordinary appendages of apparatus used for wire drawing.

The inverted block, per se, is not claimed, as it is recognized as old in the art.

What I claim is:

1. In a continuous wire drawing machine adapted to draw wire from a main wire body comprising a rotatable wire drawing block, means for rotating said block, wire severing means rotatable with said block adapted to sever wire thereon during rotation thereof and means for actuating said severing means at predetermined intervals whereby predetermined amounts of severed wire are produced from said main wire body.

2. In a continuous wire drawing machine adapted to draw wire from a main wire body comprising a rotatable wire drawing block, means for rotating said block, wire severing means rotatable with said block adapted to sever wire thereon during rotation thereof, means for actuating said severing means at predetermined intervals whereby predetermined amounts of severed wire are produced from said main wire body and means for automatically discharging said wire amounts from said block upon severance from said main wire body.

3. In a continuous wire drawing machine adapted to draw wire from a main wire body comprising a plurality of inverted rotatable wire drawing blocks, means for rotating said blocks, wire severing means rotatable with one of said blocks adapted to sever wire thereon during rotation thereof and means for actuating said severing means at predetermined intervals whereby predetermined amounts of severed wire are produced from said main wire body.

4. In a continuous wire drawing machine adapted to draw wire from a main wire body comprising a plurality of inverted rotatable wire drawing blocks, means for rotating said blocks, wire severing means rotatable with one of said blocks adapted to sever wire thereon during rotation thereof, means for actuating said severing means at predetermined intervals whereby predetermined amounts of severed wire are produced from said main wire body and means for automatically discharging said wire amounts from said block upon severance from said main wire body.

5. In a continuous wire drawing machine adapted to draw wire from a main wire body comprising a series of inverted wire drawing blocks adapted to revolve about a common shaft, means for rotating said blocks, wire severing means rotatable with the final block of said series adapted to sever wire on said block from said main wire body during rotation thereof and means for actuating said severing means at predetermined intervals whereby predetermined amounts of severed wire are produced from said main wire body.

6. In a continuous wire drawing machine adapted to draw wire from a main wire body comprising a series of inverted wire drawing blocks adapted to revolve about a common shaft, means for rotating said blocks, wire severing means rotatable with the final block of said series adapted to sever wire on said block from said main wire body during rotation thereof, means for actuating said severing means at predetermined intervals whereby predetermined amounts of severed wire are produced from said main wire body and means for automatically discharging said wire amounts from said final block upon severance from said main wire body.

7. In a continuous wire drawing machine adapted to draw wire from a main wire body comprising a series of superimposed wire drawing blocks adapted to revolve about a common shaft, means for rotating said blocks, wire severing means rotatably with the final block of said series adapted to sever wire on said block from said main wire body during rotation thereof and means for actuating said severing means at predetermined intervals whereby predetermined amounts of severed wire are produced from said main wire body.

8. In a continuous wire drawing machine adapted to draw wire from a main wire body comprising a series of superimposed wire drawing blocks adapted to revolve about a common shaft, means for rotating said blocks, wire severing means rotatable with the final block of said series adapted to sever wire on said block from said main wire body during rotation thereof, means for actuating said severing means at predetermined intervals whereby predetermined amounts of severed wire are produced from said main wire body and means for automatically discharging said wire amounts from said final block upon severance from said main wire body.

9. A wire pulling apparatus comprising a rotatable wire pulling block adapted to pull wire from a main wire body, means for rotating said block, wire measuring means associated with said block, wire severing means rotatable with said block, and means operable during the operation of said block for successively actuating said measuring means and said severing means whereby a predetermined amount of wire is severed from said main wire body.

10. A wire pulling apparatus comprising a rotatable wire pulling block adapted to pull wire from a main wire body, means for rotating said block, wire measuring means associated with said block, wire severing means rotatable with said block, means operable during the operation of said block for successively actuating said measuring means and said severing means whereby a predetermined amount of wire is severed from said main wire body and means for automatically discharging said severed amount from said block.

11. In a continuous wire drawing machine adapted to draw wire from a main wire body comprising a wire drawing block, driving means for said block, wire severing means associated with said block adapted to sever wire thereon during operation thereof, means for actuating said severing means predeterminedly whereby a predetermined amount of wire is severed from said main wire body and means for releasably attaching to said block the end of the severed wire forming a part of said main wire body.

12. In a continuous wire drawing machine adapted to draw wire from a main wire body comprising a wire drawing block, driving means for said block, wire severing means associated with said block adapted to sever wire thereon during operation thereof, means for actuating said severing means predeterminedly whereby a predetermined amount of wire is severed from said main wire body, means for releasably attaching to said block the end of the severed wire forming a part of said main wire body and means for discharging from said block said predetermined severed amount of wire.

13. A continuous wire drawing system adapted to draw wire from a main wire body comprising a series of inverted wire drawing blocks adapted to revolve about a common shaft, means for maintaining wire tension on certain of said blocks, automatic speed changing means associated with said tensioning means for controlling the rate of speed of certain of said blocks, means for stopping said series of blocks when said wire breaks, wire severing means associated with the final block of said series adapted to sever wire thereon during operation thereof and means for actuating said severing means at predetermined intervals whereby predetermined amounts of severed wire are produced from said main wire body.

14. A continuous wire drawing system adapted to draw wire from a main wire body comprising a series of inverted wire drawing blocks adapted to revolve about a common shaft, means for maintaining wire tension on certain of said blocks, automatic speed changing means associated with said tensioning means for controlling the rate of speed of certain of said blocks, means for stopping said series of blocks when said wire breaks, wire severing means associated with the final block of said series adapted to sever wire thereon during operation thereof, means for actuating said severing means at predetermined intervals whereby predetermined amounts of severed wire are produced from said main wire body and means for discharging said wire amounts from said block upon severance from said main wire body.

15. A continuous wire drawing system adapted to draw wire from a main wire body comprising a series of inverted wire drawing blocks adapted to revolve about a common shaft, means for maintaining wire tension on certain of said blocks, automatic speed changing means associated with said tensioning means for controlling the rate of speed of certain of said blocks, means for stopping said blocks upon wire breakage, wire severing means associated with the final block of said series adapted to sever wire thereon during operation thereof, means for actuating said severing means at predetermined intervals whereby predetermined amounts of severed wire are produced from said main wire body, means for releasably securing to said final block the severed end of said wire forming a part of said main wire body, and means for discharging from said final block the wire amounts severed from said main wire body.

16. In a continuous wire pulling system comprising a rotatable block adapted to pull wire from a main wire body, wire severing means rotatable with and controllable by said block adapted for severing wire on said block from said main wire body and means for actuating said severing means during said pulling operation of said block.

17. In a continuous wire pulling system comprising a rotatable block adapted to pull wire from a main wire body, wire severing means rotatable with and controllable by said block adapted for severing wire on said block from said main wire body, means for actuating said severing means during said pulling operation of said block and means for automatically discharging said severed wire from said block during said pulling operation.

18. In a continuous wire pulling system comprising a block adapted to pull wire from a main wire body, wire severing means associated with said block adapted for severing wire on said block from said main wire body, means for actuating said severing means during said pulling operation of said block and means for releasably attaching to said block the end of the severed wire forming a part of said main wire body.

19. In a continuous wire pulling system comprising a block adapted to pull wire from a main wire body, wire severing means associated with said block adapted for severing wire on said block from said main wire body, means for actuating said severing means during said pulling operation of said block, means for releasably attaching to said block the end of the severed wire forming a part of said main wire body and means for discharging said severed wire from said block during said pulling operation.

20. In a continuous wire drawing machine adapted for drawing wire from a main wire body, in combination, a support, a shaft mounted in said support, a series of wire drawing blocks rotatively mounted on said shaft, means for rotating said blocks, a wire carrier supported by the final of said blocks, wire severing means rotatable with and controllable by said final block, and means for actuating said severing means during drawing operation of said block whereby severed wire from said main wire body is disposed on said wire carrier.

21. In a continuous wire drawing machine adapted for drawing wire from a main wire body, in combination, a support, a shaft mounted in said support, a series of wire drawing blocks rotatively mounted on said shaft, means for rotating said blocks, a wire carrier supported by the final of said blocks, a wire bundle discharging mechanism on said carrier, wire severing means rotatable with and controllable by said final block, means for actuating said severing means during drawing operation of said block whereby severed wire from said main wire body is disposed on said wire carrier and means for automatically actuating said bundle discharging mechanism in timed relation to the actuation of said severing means whereby the severed wire is discharged from said carrier.

22. In a continuous wire drawing machine adapted for drawing wire from a main wire body, in combination, a support, a shaft mounted in said support, a series of wire drawing blocks rotatively mounted on said shaft, means for rotating said blocks, a wire carrier supported by the final of said blocks, wire severing means associated with said final block, means for actuating said severing means during drawing operation of said block whereby severed wire from said main wire body is disposed on said wire carrier and means for releasably attaching to said final block the end of the severed wire forming a part of said main wire body.

23. In a continuous wire drawing machine adapted for drawing wire from a main wire body, in combination, a support, a shaft mounted in said support, a series of wire drawing blocks rotatively mounted on said shaft, means for rotating said blocks, a wire carrier supported by the final of said blocks, a wire bundle discharging mechanism on said carrier, wire severing means associated with said final block, means for actuating said severing means during drawing operation of said block whereby severed wire from said main wire body is disposed on said wire carrier, means for releasably attaching to said final block the end of the severed wire forming a part of said main wire body and means for actuating said bundle discharging mechanism whereby the severed wire is discharged from said carrier.

24. In a continuous wire drawing machine adapted for drawing wire from a main wire body, in combination, a support, a shaft mounted in said support, a series of superimposed wire drawing blocks mounted for rotation on said shaft, means for rotating said blocks, a wire carrier supported by the lower and final of said blocks, wire severing means rotatable with and controllable by said final block, and means for actuating said severing means during drawing operation of said block whereby severed wire from said main wire body is disposed on said wire carrier.

25. In a continuous wire drawing machine adapted for drawing wire from a main wire body, in combination, a support, a shaft mounted in said support, a series of superimposed wire drawing blocks mounted for rotation on said shaft, means for rotating said blocks, a wire carrier supported by the lower and final of said blocks, a wire bundle discharging mechanism on said carrier, wire severing means rotatable with and controllable by said final block, means for automatically actuating said severing means during drawing operation of said block whereby severed wire from the main wire body is disposed on said wire carrier and means for actuating said bundle discharging mechanism in timed relation to the actuation of said severing means whereby the severed wire is discharged from said carrier.

26. In a continuous wire drawing system having wire drawing blocks adapted to draw wire from a main wire body, including a wire amount measuring means, wire severing means associated with the final block of said system adapted to be caused to operate by said measuring means associated with said block and with said severing means when said measuring means reaches a predetermined manually positioned setting, toggle means associated with said final block adapted when in an extended position to act as a wire supporting means, said toggle means being caused to withdraw said support by the timed primary action of said measuring means.

27. In a continuous wire drawing system having wire drawing blocks adapted to draw wire from a main wire body, including a wire amount measuring means, wire severing means associated with the final block of said system adapted to be caused to operate by said measuring means associated with said final block and with said severing means, when said measuring means reaches a predetermined setting, toggle means associated with said final block adapted when in an extended position to act as a wire supporting means, said toggle means being caused to withdraw said support by the primary action of said measuring means, and means caused to operate in timed relation with said wire severing means to releasably attach the severed end of the main wire body to said final block.

28. In a continuous wire drawing system having wire drawing blocks adapted to draw wire from a main wire body, in combination, measuring means adapted to continuously measure the amount of wire drawn by the final block of said system, wire severing means associated with said block and adapted to be caused to operate by said wire measuring means, wire discharging means also adapted to be caused to operate by said wire measuring means, means associated with said wire measuring means adapted to cause said measuring means to function at predetermined intervals to cause a predetermined amount of wire to be severed on said block from said main wire body, and to cause said severed amount of wire to be discharged from said block.

29. In a continuous wire drawing system having wire drawing blocks adapted to draw wire from a main wire body, in combination, measuring means adapted to continuously measure the amount of wire drawn by the final block of said system, wire severing means associated with said block and adapted to be caused to operate by said wire measuring means, wire discharging means also adapted to be caused to operate by said wire measuring means, means associated with said wire measuring means adapted to cause said measing means to function at predetermined intervals to cause to predetermined amount of wire to be severed on said block from said main wire body, and to cause said severed amount of wire to be discharged from said block without interruption of said wire drawing operation.

30. In a continuous wire drawing system having wire drawing blocks adapted to draw wire from a main wire body, and having electrical circuits associated therewith adapted to be energized or de-energized, in combination, wire severing means, measuring means adapted to measure the amount of wire on the final block of said system, and further adapted to be set at certain points, said points corresponding to certain amounts of wire disposed on said final block, and being connected through said electrical circuits to said wire severing means, said wire severing means being electrically connected to wire supporting and discharging means associated with said block, said wire severing means and said wire discharging means being caused to operate through the energizing of said electrical circuits when said measuring means reaches said set points.

31. A continuous wire drawing block adapted to draw wire from a main wire body comprising means for automatically maintaining wire tension on said block, means for changing the speed of said block to conform to the change of tension of wire on said block, means for stopping said block when said wire breaks, means for automatically severing wire on said block from said main wire body at a predetermined time and means for discharging said severed wire from said block.

32. In a wire-drawing machine including a continuous wire drawing block adapted to draw wire from a main wire body, in combination, wire severing means for automatically severing wire on said block, means for releasably attaching to said block the severed end of said wire forming a part of said main wire body, and means for automatically causing the discharge from said block of that part of said wire severed from said main wire body.

33. A continuous wire-drawing block adapted to draw wire from a main wire body comprising means for automatically maintaining wire tension on said block, means for changing the speed of said block to conform to the change of tension of wire on said block, means for stopping said block when said wire breaks, means for automaticalliy severing wire on said block from said main wire body at a predetermined time, means for releasably attaching to said block the severed end of said wire forming a part of said main wire body, and means for automatically causing the discharge from said block of the wire severed from said main wire part.

34. A continuous wire-drawing system, including a plurality of continuous wire drawing blocks adapted to draw wire from a main wire body, comprising means for changing the speed of said blocks, means for stopping said blocks when said wire breaks, means for automatically severing wire from said main wire body at predetermined intervals on the final block of said plurality of blocks, and means for discharging said severed wire from said final block at predetermined intervals and having a definite timed relation to said wire severing intervals.

35. A continuous wire drawing block adapted to draw wire from a main wire body comprising means for stopping said block when said wire breaks, means for automatically severing an amount of said wire on said block during operation thereof from said main wire body at a predetermined time and means for discharging said severed amount of wire from said block.

36. A continuous wire drawing block adapted to draw wire from a main wire body comprising means for changing the speed of said block, means for stopping said block when said wire breaks, means for severing wire on said block from said main wire body at a predetermined time and means for discharging said severed wire from said block.

37. A continuous wire drawing block adapted to draw wire from a main wire body comprising means for controlling the speed of operation of said block, means for automatically severing a predetermined amount of wire from said main wire body on said block during operation thereof at a predetermined time and means for discharging said severed wire amount from said block.

38. A continuous wire drawing system adapted to draw wire from a main wire body comprising principal supporting members, two vertical shafts held by said supporting members, a series of superimposed inverted wire drawing blocks adapted to revolve about the first of said shafts, said blocks adapted to be driven by the second of said shafts, electrical operating circuits connected to an electrical power source and adapted to be opened and closed through contactors, coacting subsidiary sheave supporting members adapted to allow the up and down movement of sheaves therebetween, said movement thereof caused by changes in wire tension on certain of said blocks and having electrical contactors on said members adapted to be engaged by the movements of said sheaves, said contactors upon being contacted by said sheaves adapted to energize thrustors in said circuit to actuate clutch mechanism on the second of said shafts for changing the speed of certain of said blocks to conform to said changes in wire tension thereon, a wire drawing die in association with each of said blocks; said dies, blocks, and sheaves adapted to have a wire passed therethrough and therearound in sequential order, said sheaves being counterbalanced to maintain proper wire tension and adapted to move into contact relation with said electrical contactors to cause said tension to be maintained, and/or to stop said blocks.

39. The method of pulling wire from a main wire body and transforming it into coiled predetermined amounts of severed wire which consists in pulling and coiling said wire from said main wire body on a rotating pulling block, the actuation of which is normally continuous, thence subjecting said wire to the timed action of a wire severing means, said severing means controlled by a manually settable wire measuring means, whereby upon operation of said measuring means at the point set, said severing means is caused to function to sever said wire from said main wire body on said block, whereby a predetermined amount of coiled severed wire is produced from said main wire body, and finally releasably attaching to said block the end of the severed wire forming a part of said main wire body on said block.

40. The method of pulling wire from a main wire body and transforming it into coiled predetermined amounts of severed wire which consists in pulling and coiling said wire from said main wire body on a rotating pulling block, the actuation of which is normally continuous, thence subjecting said wire to the timed action of a wire severing means, said severing means controlled by a manually settable wire measuring means, whereby upon operation of said measuring means at the point set, said severing means is caused to function to sever said wire from said main wire body on said block, whereby a predetermined amount of coiled severed wire is produced from said main wire body, and finally discharging said severed amount of wire from said block.

41. The method of pulling wire from a main wire body and transforming it into coiled predetermined amounts of severed wire which consists in pulling and coiling said wire from said main wire body on a rotating pulling block, the actuation of which is normally continuous, thence subjecting said wire to the timed action of a wire severing means, said severing means controlled by a manually settable wire measuring means, whereby upon operation of said measuring means at the point set, said severing means is caused to function to sever said wire from said main wire body on said block, whereby a predetermined amount of coiled severed wire is produced from said main wire body, thence releasably attaching to said block the end of the severed wire forming a part of said main wire body on said block and finally discharging said severed amount of wire from said block.

42. The method of pulling wire from a main wire body and transforming it into coiled predetermined amounts of severed wire which consists in pulling and coiling said wire from said main wire body on a series of rotating pulling blocks, the actuation of which blocks are normally continuous, and subjecting said wire during pulling thereof on the final block of said series to the timed action of a wire severing means, said severing means controlled by a manually settable wire measuring means, whereby upon operation of said measuring means at the point set, said severing means is caused to function to sever said wire from said main wire body on said final block, whereby a predetermined amount of coiled severed wire is produced from said main wire body.

43. The method of pulling wire from a main wire body and transforming it into coiled predetermined amounts of severed wire which consists in pulling and coiling said wire from said main wire body on a series of rotating pulling blocks, the actuation of which blocks are normally continuous, thence subjecting said wire during pulling thereof on the final block of said series to the timed action of a wire severing means, said severing means controlled by a manually settable wire measuring means, whereby upon operation of said measuring means at the point set, said severing means is caused to function to sever said wire from said main wire body on said final block, whereby a predetermined amount of coiled severed wire is produced from said main wire body, and finally releasably attaching to said final block the end of the severed wire forming a part of said main wire body on said final block.

44. The method of pulling wire from a main wire body and transforming it into coiled predetermined amounts of severed wire which consists in pulling and coiling said wire from said main wire body on a series of rotating pulling blocks, the actuation of which blocks are normally continuous, thence subjecting said wire during pulling thereof on the final block of said series to the timed action of a wire severing means, said severing means controlled by a manually settable wire measuring means, whereby upon operation of said measuring means at the point set, said severing means is caused to function to sever said wire from said main wire body on said final block, whereby a predetermined amount of coiled severed wire is produced from said main wire body, and finally discharging said severed amount of wire from said final block.

45. The method of pulling wire from a main wire body and transforming it into coiled predetermined amounts of severed wire which consists in pulling and coiling said wire from said main wire body on a series of rotating pulling blocks, the actuation of which blocks are normally continuous, thence subjecting said wire during pulling thereof on the final block of said series to the timed action of a wire severing means, said severing means controlled by a manually settable wire measuring means, whereby upon operation of said measuring means at the point set, said severing means is caused to function to sever said wire from said main wire body on said final block, whereby a predetermined amount of coiled severed wire is produced from said main wire body, thence releasably attaching to said final block the end of the severed wire forming a part of said main wire body on said block and finally discharging said severed amount of wire from said final block.

46. The method of drawing wire from a main wire body and transforming it into a lesser gauge of coiled predetermined amounts of severed wire which consists in pulling said wire through a wire drawing gauge reducing die by means of a pulling block and coiling said wire thereon, the actuation of which block is normally continuous, and subjecting said reduced wire on said block during said pulling operation thereof to the timed action of a wire severing means, said severing means controlled by a manually settable wire measuring means, whereby upon operation of said measuring means at the point set, said severing means is caused to function to sever said reduced wire from said main wire body on said block, whereby a predetermined amount of coiled severed and reduced wire is produced from said main wire body.

47. The method of drawing wire from a main wire body and transforming it into a lesser gauge of coiled predetermined amounts of severed wire which consists in pulling said wire through a wire drawing gauge reducing die by means of a pulling block and coiling said wire thereon, the actuation of which block is normally continuous, thence subjecting said reduced wire on said block during said pulling operation thereof to the timed action of a wire severing means, said severing means controlled by a manually settable wire measuring means, whereby upon operation of said measuring means at the point set, said severing means is caused to function to sever said reduced wire from said main wire body on said block, whereby a predetermined amount of coiled severed and reduced wire is produced from said main wire body, and finally releasably attaching to said block the end of the severed wire forming a part of said main wire body on said block.

48. The method of drawing wire from a main wire body and transforming it into a lesser gauge of coiled predetermined amounts of severed wire which consists in pulling said wire through a wire drawing gauge reducing die by means of a pulling block and coiling said wire thereon, the actuation of which block is normally continuous, thence subjecting said reduced wire on said block during said pulling operation thereof to the timed action of a wire severing means, said severing means controlled by a manually settable wire measuring means, whereby upon operation of said measuring means at the point set, said severing means is caused to function to sever said reduced wire from said main wire body on said block, whereby a predetermined amount of coiled severed and reduced wire is produced from said main wire body, and finally automatically discharging said severed amount of reduced wire from said block in timed relation to the actuation of said severing means.

49. The method of drawing wire from a main wire body and transforming it into a lesser gauge of coiled predetermined amounts of severed wire which consists in pulling said wire through a wire drawing gauge reducing die by means of a pulling block and coiling said wire thereon, the actuation of which block is normally continuous, thence subjecting said reduced wire on said block during said pulling operation thereof to the timed action of a wire severing means, said severing means controlled by a manually settable wire measuring means, whereby upon operation of said measuring means at the point set, said severing means is caused to function to sever said reduced wire from said main wire body on said block, whereby a predetermined amount of coiled severed and reduced wire is produced from said main wire body, thence releasably attaching to said block the end of the severed wire forming a part of said main wire body on said block and finally discharging said severed amount of reduced wire from said block.

50. The method of drawing wire from a main wire body and transforming it into a lesser gauge of coiled predetermined amounts of severed wire which consists in subjecting said wire to a succession of steps comprising the pulling of said wire from said main wire body through a series of wire drawing gauge reducing dies by means of a like series of rotating and pulling blocks, the actuation of which blocks are normally continuous, thence subjecting said reduced wire during pulling thereof on the final of said blocks to the timed action of a wire severing means, said severing means controlled by a manually settable wire measuring means, whereby upon operation of said measuring means at the point set, said severing means is caused to function to sever said reduced wire from said main wire body on said final block, whereby a predetermined amount of coiled severed and reduced wire is produced from said main wire body, and finally releasably attaching to said final block the end of the severed wire forming a part of said main wire body on said block.

51. The method of drawing wire from a main wire body and transforming it into a lesser gauge of coiled predetermined amounts of severed wire which consists in subjecting said wire to a succession of steps comprising the pulling of said wire from said main wire body through a series of wire drawing gauge reducing dies by means of a like series of rotating and pulling blocks, the actuation of which blocks are normally continuous, thence subjecting said reduced wire during pulling thereof on the final of said blocks to the timed action of a wire severing means, said severing means controlled by a manually settable wire measuring means, whereby upon operation of said measuring means at the point set, said severing means is caused to function to sever said reduced wire from said main wire body on said final block, whereby a predetermined amount of coiled severed and reduced wire is produced from said main wire body, and finally automatically discharging said severed amount of reduced wire from said final block in timed relation to the actuation of said severing means.

52. The method of drawing wire from a main wire body and transforming it into a lesser gauge of coiled predetermined amounts of severed wire which consists in subjecting said wire to a succession of steps comprising the pulling of said wire from said main wire body through a series of wire drawing gauge reducing dies by means of a like series of rotating and pulling blocks, the actuation of which blocks are normally continuous, thence subjecting said reduced wire during pulling thereof on the final of said blocks to the timed action of a wire severing means, said severing means controlled by a manually settable wire measuring means, whereby upon operation of said measuring means at the point set, said severing means is caused to function to sever said reduced wire from said main wire body on said final block, whereby a predetermined amount of coiled severed and reduced wire is produced from said main wire body, and thence releasably attaching to said final block the end of the severed wire forming a part of said main wire body on said block and finally discharging said severed amount of reduced wire from said final block.

53. A wire pulling apparatus adapted for pulling wire comprising a series of rotatable wire pulling blocks, said series of blocks comprising initial, intermediate and final blocks, power means for rotating said blocks, and means operable by said intermediate and final blocks adapted upon breakage of the wire being pulled by either of said blocks to instantly stop said power means, thereby stopping the pulling operation of said series of blocks.

54. A wire pulling apparatus adapted for pulling wire comprising a series of rotatable wire pulling blocks, said series of blocks comprising initial, intermediate and final blocks, power means for positively rotating said series of blocks, and means in association with said intermediate and final blocks thereof and operable thereby, adapted upon breakage of the wire being pulled by either of said intermediate and final blocks to instantly interrupt and stop said power means, thereby positively disconnecting the power means from said series of blocks and stopping the joint pulling operation thereof.

55. A wire pulling apparatus adapted for pulling wire comprising a series of rotatable wire pulling blocks, a shaft common to and on which all of the blocks are mounted, said series of blocks comprising initial, intermediate and final blocks, power means for rotating said blocks, and means operable by either of said intermediate and final blocks adapted upon breakage of the wire being pulled by either of said blocks to instantly stop said power means, thereby stopping the pulling operation of said series of blocks.

GEORGE N. WILLIAMS.